(12) United States Patent
Chenna

(10) Patent No.: US 8,667,281 B1
(45) Date of Patent: Mar. 4, 2014

(54) SYSTEMS AND METHODS FOR TRANSFERRING AUTHENTICATION CREDENTIALS

(75) Inventor: Srinivas Chenna, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 93 days.

(21) Appl. No.: 13/483,835

(22) Filed: May 30, 2012

(51) Int. Cl.
*H04L 29/06* (2006.01)

(52) U.S. Cl.
USPC ............. 713/168; 713/169; 713/170; 726/27; 726/28; 726/29; 726/30

(58) Field of Classification Search
USPC ........................................................ 713/168
See application file for complete search history.

(56) References Cited

U.S. PATENT DOCUMENTS

2012/0204032 A1* 8/2012 Wilkins et al. ................ 713/170

OTHER PUBLICATIONS

Mingliang Pei; Methods and Systems for Authenticating Devices; U.S. Appl. No. 13/336,435; filed Dec. 23, 2011.

\* cited by examiner

*Primary Examiner* — Longbit Chai
(74) *Attorney, Agent, or Firm* — ALG Intellectual Property, LLC

(57) ABSTRACT

A computer-implemented method for transferring authentication credentials may include 1) identifying a request to receive an authentication credential that is stored on a first computing device onto a second computing device, 2) identifying an asymmetric key pair on the second computing device, 3) generating an identifier of the asymmetric key pair on the second computing device, 4) transmitting an encryption key of the asymmetric key pair and the identifier of the asymmetric key pair to a credential repository, 5) displaying the identifier of the asymmetric key pair to facilitate retrieval of the authentication credential from the credential repository based on the identifier, and 6) retrieving the authentication credential, encrypted with the encryption key of the asymmetric key pair, from the credential repository. Various other methods and systems are also disclosed.

20 Claims, 7 Drawing Sheets

SYSTEMS AND METHODS FOR TRANSFERRING AUTHENTICATION CREDENTIALS

BACKGROUND

Individuals and organizations increasingly rely on digital communications (e.g., via the Internet) to conduct their daily affairs. Due to the sensitivity of some transactions, these individuals and organizations may wish to communicate securely and to ensure that a party to a transaction is who the party claims to be.

In some cases, parties to a transaction may use a shared secret (e.g., information that each party has to the exclusion of the rest of the world) to communicate securely and/or to provide authentication. For example, a shared secret may be used to derive one or more encryption and/or authentication keys and/or to generate message authentication codes to authenticate messages. In some cases, a shared secret may be used to generate one-time passwords.

Unfortunately, associating a user identity with a credential may be a cumbersome process. This cost may multiply when users use a credential for authenticating with multiple services, when users own and/or operate multiple devices, and/or when users replace devices. Accordingly, the instant disclosure identifies and addresses a need for systems and methods for transferring authentication credentials.

SUMMARY

As will be described in greater detail below, the instant disclosure generally relates to systems and methods for transferring authentication credentials by submitting an encryption key from an asymmetric key pair on a target device to a central repository, along with a unique identifier displayed to a user for an out-of-band verification. The user may then enter the unique identifier in a source device, allowing the source device to retrieve the encryption key, encrypt the authentication credential, and submit the encrypted authentication credential to the central repository (e.g., in association with the unique identifier) for retrieval by the target device. In one example, a computer-implemented method for transferring authentication credentials may include 1) identifying a request to receive an authentication credential that is stored on a first computing device onto a second computing device, 2) identifying an asymmetric key pair on the second computing device, 3) generating an identifier of the asymmetric key pair on the second computing device, 4) transmitting an encryption key of the asymmetric key pair and the identifier of the asymmetric key pair to a credential repository, 5) displaying the identifier of the asymmetric key pair to facilitate retrieval of the authentication credential from the credential repository based on the identifier, and 6) retrieving the authentication credential, encrypted with the encryption key of the asymmetric key pair, from the credential repository.

In some examples, generating the identifier of the asymmetric key pair may include generating a hash of the asymmetric key pair. In one embodiment, the computer-implemented method may also include decrypting the authentication credential with a decryption key of the asymmetric key pair. In one example, the computer-implemented method may include using the authentication credential to generate (on the second computing device) a one-time password for authenticating the second computing device with a service that was previously accessed from the first computing device. In one example, the computer-implemented method may also include transmitting a message to the credential repository to delete the encryption key of the asymmetric key pair.

In one example, an additional computer-implemented method for transferring authentication credentials may include 1) identifying a request to transfer an authentication credential that is stored on a first computing device onto a second computing device, 2) identifying an identifier (that was generated on the second computing device) of an asymmetric key pair (an encryption key of the asymmetric key pair having previously been transferred from the second computing device to a credential repository, and a decryption key of the asymmetric key pair being available to the second computing device), 3) retrieving the encryption key of the asymmetric key pair from the credential repository based on the identifier of the asymmetric key pair, 4) encrypting the authentication credential with the encryption key of the asymmetric key pair, and 5) transmitting the authentication credential encrypted with the encryption key to the credential repository for subsequent retrieval by the second computing device.

In some examples, the identifier of the asymmetric key pair may include a hash of the asymmetric key pair generated by the second computing device. In one embodiment, the identifier of the asymmetric key pair may have been displayed by the second computing device to a user. In this example, identifying the identifier of the asymmetric key pair may include receiving the identifier as a user-generated input on the first computing device.

In some embodiments, the additional computer-implemented method may also include deleting the authentication credential from the second computing device after transmitting the authentication credential to the credential repository. In one example, the additional computer-implemented method may also include using the authentication credential to generate (on the first computing device) a one-time password for authenticating the first computing device with a service that was previously accessed from the second computing device.

In one embodiment, a system for implementing the above-described method may include 1) an identification module programmed to (i) identify a request to receive an authentication credential that is stored on a first computing device onto a second computing device and (ii) identify an asymmetric key pair on the second computing device, 2) a generation module programmed to generate an identifier of the asymmetric key pair on the second computing device, 3) a transmission module programmed to transmit an encryption key of the asymmetric key pair and the identifier of the asymmetric key pair to a credential repository, 4) a displaying module programmed to display the identifier of the asymmetric key pair to facilitate retrieval of the authentication credential from the credential repository based on the identifier, and 5) a retrieval module programmed to retrieve the authentication credential, encrypted with the encryption key of the asymmetric key pair, from the credential repository. The system may also include at least one processor configured to execute the identification module, the generation module, the transmission module, the displaying module, and the retrieval module.

In some examples, the system may also include 1) a request module programmed to identify (at the first computing device) a request to transfer the authentication credential that is stored on the first computing device onto the second computing device, 2) an identifier module programmed to identify the identifier of the asymmetric key pair, 3) a key module programmed to retrieve the encryption key of the asymmetric key pair from the credential repository based on the identifier of the asymmetric key pair, 4) an encryption module programmed to encrypt the authentication credential with the encryption key of the asymmetric key pair, and 5) a transfer module programmed to transmit the authentication credential encrypted with the encryption key to the credential repository for subsequent retrieval by the second computing device. In these examples, the system may also include at least one additional processor configured to execute the request module, the identifier module, the key module, the encryption module, and the transfer module.

As will be explained in greater detail below, by submitting an encryption key from an asymmetric key pair on the target device to a central repository, along with a unique identifier displayed to a user for an out-of-band verification (and then, e.g., allowing a user to then enter the unique identifier in the source device, allowing the source device to retrieve the encryption key, encrypting the authentication credential, and submitting the encrypted authentication credential to the central repository for retrieval by the target device), the systems and methods described herein may allow a user to conveniently, securely, and, in some examples, anonymously transfer (and/or duplicate) authentication credentials from a source device to a target device. For example, by using an identifier for storing and retrieving the encryption key and/or the encrypted authentication credential that is not traceable to the user (but instead, e.g., is based on a feature of the asymmetric key pair), these systems and methods may provide anonymous transfer of authentication credentials while also providing a secure transfer of the same.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
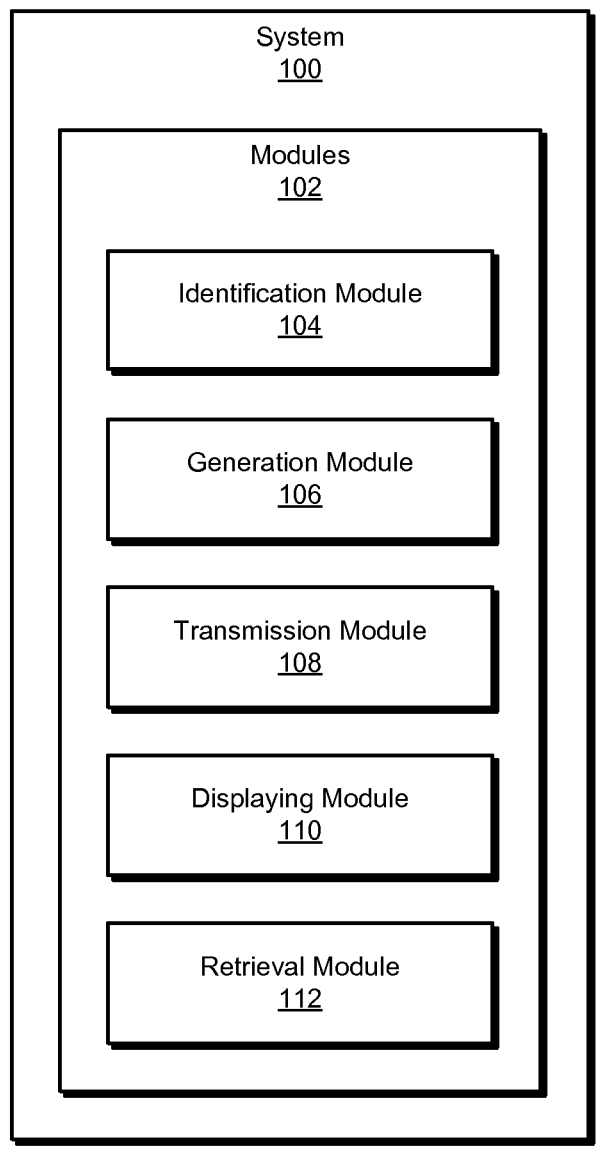
FIG. 1 is a block diagram of an exemplary system for transferring authentication credentials.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
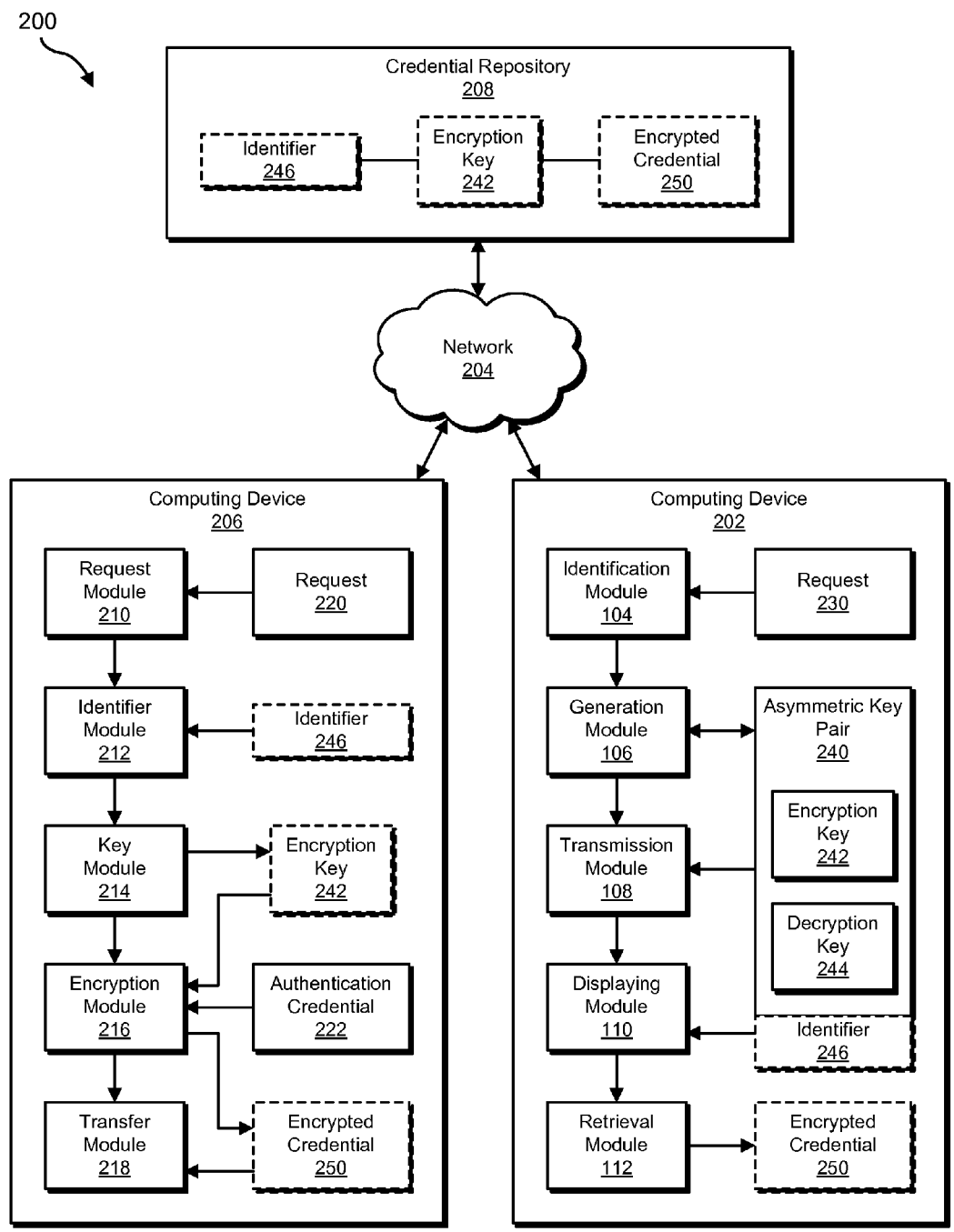
FIG. 2 is a block diagram of an exemplary system for transferring authentication credentials.

The following will provide, with reference to FIGS. 1-2, detailed descriptions of exemplary systems for transferring authentication credentials. Detailed descriptions of corresponding computer-implemented methods will also be provided in connection with FIGS. 3 and 5. Detailed descriptions of an exemplary credential transfer will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for transferring authentication credentials. As illustrated in this figure, exemplary system 100 may include one or more modules 102 for performing one or more tasks. For example, and as will be explained in greater detail below, exemplary system 100 may include an identification module 104 programmed to 1) identify a request to receive an authentication credential that is stored on a first computing device onto a second computing device and 2) identify an asymmetric key pair on the second computing device. Exemplary system 100 may also include a generation module 106 programmed to generate an identifier of the asymmetric key pair on the second computing device.

In addition, and as will be described in greater detail below, exemplary system 100 may include a transmission module 108 programmed to transmit an encryption key of the asymmetric key pair and the identifier of the asymmetric key pair to a credential repository. Exemplary system 100 may also include a displaying module 110 programmed to display the identifier of the asymmetric key pair to facilitate retrieval of the authentication credential from the credential repository based on the identifier. Exemplary system 100 may further include a retrieval module 112 programmed to retrieve the authentication credential, encrypted with the encryption key of the asymmetric key pair, from the credential repository. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 206, and/or credential repository 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 and a computing device 206 in communication with a credential repository 208 via a network 204

(e.g., to facilitate the transfer of authentication credential 222 from computing device 206 to computing device 202).

In one embodiment, one or more of modules 102 from FIG. 1 may, when executed by at least one processor of computing device 202, facilitate computing device 202 in transferring authentication credentials from computing device 206 to computing device 202. For example, and as will be described in greater detail below, one or more of modules 102 may cause computing device 202 to 1) identify a request 230 to receive authentication credential 222 that is stored on computing device 206 onto computing device 202, 2) identify an asymmetric key pair 240 (e.g., including an encryption key 242 and a decryption key 244) on computing device 202, 3) generate an identifier 246 of asymmetric key pair 240 on computing device 202, 4) transmit encryption key 242 of asymmetric key pair 240 and identifier 246 of asymmetric key 240 pair to credential repository 208, 5) display identifier 246 of asymmetric key pair 240 to facilitate retrieval of authentication credential 222 from credential repository 208 based on identifier 246, and 6) retrieve an encrypted credential 250 (e.g., authentication credential 222 encrypted with encryption key 242 of asymmetric key pair 240), from credential repository 208.

Additionally, in one example, one or more of the modules on computing device 206 may, when executed by at least one processor of computing device 206, facilitate computing device 206 in transferring authentication credentials from computing device 206 to computing device 202. For example, and as will be described in greater detail below, a request module 210, an identifier module 212, a key module 214, an encryption module 216, and/or a transfer module 218 may cause computing device 206 to 1) identify a request 220 to transfer authentication credential 222 that is stored on computing device 206 onto computing device 202, 2) identify identifier 246 (e.g., that was generated on computing device 202) of asymmetric key pair 240, 3) retrieve encryption key 242 from credential repository 208 based on identifier 246, 4) encrypt authentication credential 222 with encryption key 242 (e.g., resulting in encrypted credential 250), and 5) transmit encrypted credential 250 to credential repository 208 for subsequent retrieval by computing device 202.

Computing device 202 generally represents any type or form of computing device capable of reading computer-executable instructions. Examples of computing device 202 include, without limitation, tablets, cellular phones, laptops, desktops, servers, personal digital assistants (PDAs), multimedia players, embedded systems, combinations of one or more of the same, exemplary computing system 610 in FIG. 6, or any other suitable computing device.

Computing device 206 generally represents any type or form of computing device capable of reading computer-executable instructions. Examples of computing device 206 include, without limitation, tablets, cellular phones, laptops, desktops, servers, personal digital assistants (PDAs), multimedia players, embedded systems, combinations of one or more of the same, exemplary computing system 610 in FIG. 6, or any other suitable computing device.

Credential repository 208 generally represents any type or form of computing device and/or database that is capable of receiving, storing, transmitting, indexing, and/or relaying data. Examples of credential repository 208 include, without limitation, application servers and database servers configured to provide various database services and/or run certain software applications. Credential repository 208 may represent portions of a single database or computing device or a plurality of databases or computing devices. For example, credential repository 208 may represent a portion of computing system 610 in FIG. 6 and/or portions of exemplary network architecture 700 in FIG. 7.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202, computing device 206, and credential repository 208.

Figure 3:
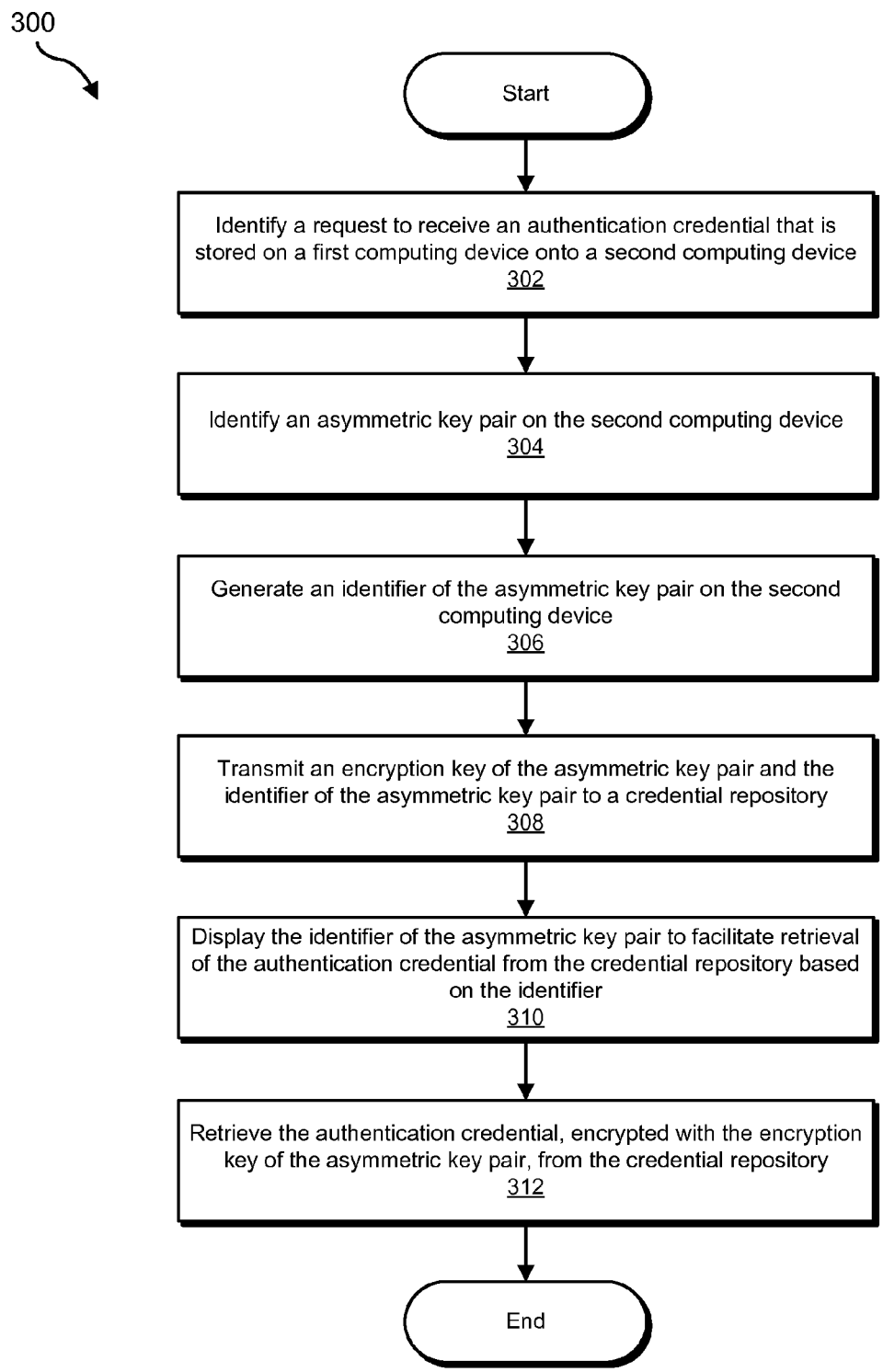
FIG. 3 is a flow diagram of an exemplary method for transferring authentication credentials.

FIG. 3 is a flow diagram of an exemplary computer-implemented method 300 for transferring authentication credentials. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request to receive an authentication credential that is stored on a first computing device onto a second computing device. For example, at step 302 identification module 104 may, as part of computing device 202 in FIG. 2, identify request 230 to receive authentication credential 222 that is stored on computing device 206 onto computing device 202.

As used herein, the term "authentication credential" may refer to any authentication factor and/or information used to derive an authentication factor. In some examples, the term "authentication credential" may refer to a shared secret. Additionally or alternatively, the term "authentication credential" may refer to information which, in combination with information already possessed by a device, allows the device to derive a shared secret. For example, the term "authentication credential" may refer to a one-time-password credential that may be used to derive one or more one-time passwords.

Identification module 104 may identify the request in any suitable context. For example, identification module 104 may identify the request by receiving user input to initiate a transfer. In some examples, identification module 104 may identify the request simply by executing as a part of an application configured to facilitate the transfer of authentication credentials.

In some examples, the request to transfer the authentication credential may include a request to add the authentication credential to the second computing device and remove the authentication credential from the first computing device. Alternatively, the request to transfer the authentication credential may include a request to add the authentication credential to the second computing device while maintaining a copy of the authentication credential on the first computing device (e.g., so that both computing devices may use the authentication credential).

Figure 4:
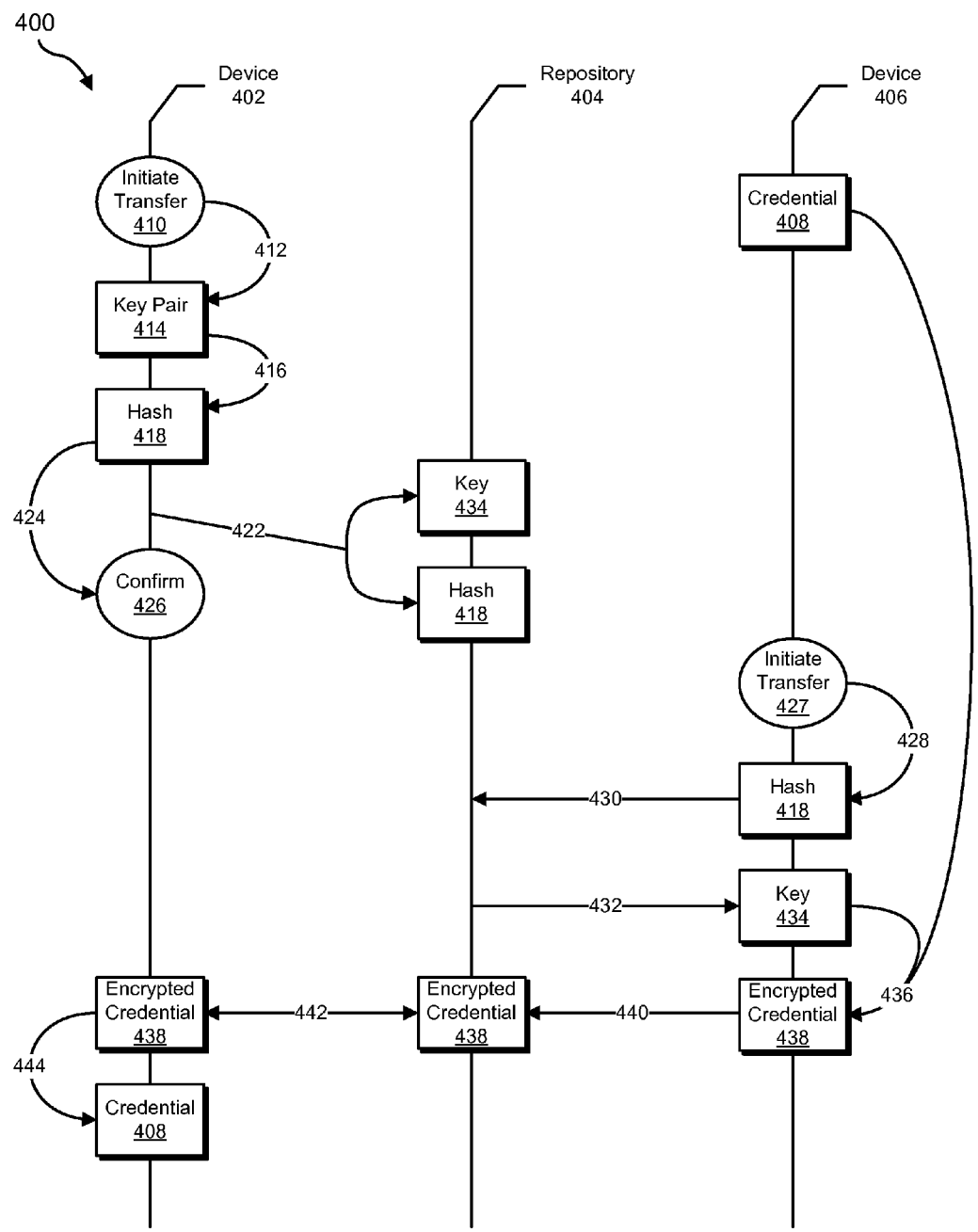
FIG. 4 is an illustration of an exemplary credential transfer.

FIG. 4 illustrates an exemplary credential transfer 400. As shown in FIG. 4, exemplary credential transfer 400 may include a device 402, a repository 404, and a device 406. Accordingly, exemplary credential transfer 400 may entail transferring a credential 408 from device 406 to device 402. Using FIG. 4 as an example, at step 302 identification module 104 may identify the request when device 402 performs a step 410 to initiate the process on device 402 of transferring credential 408 to device 402.

Returning to FIG. 3, at step 304 one or more of the systems described herein may identify an asymmetric key pair on the second computing device. For example, at step 304 identification module 104 may, as part of computing device 202 in FIG. 2, identify asymmetric key pair 240 (e.g., including encryption key 242 and decryption key 244) on computing device 202.

As used herein, the phrase "asymmetric key pair" may refer to any pair of cryptographic keys that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair.

Identification module 104 may identify the asymmetric key pair in any suitable manner. For example, identification module 104 may generate the asymmetric key pair. Additionally or alternatively, identification module 104 may receive the asymmetric key pair from a key generating service. In some examples, the decryption key of the asymmetric key pair may exist only on the second computing device and may not be available to any other device described herein or, in some examples, to any other device generally.

Using FIG. 4 as an example, at step 412 identification module 104 may, as a part of device 402, generate a key pair 414.

Returning to FIG. 3, at step 306 one or more of the systems described herein may generate an identifier of the asymmetric key pair on the second computing device. For example, at step 306 generation module 106 may, as part of computing device 202 in FIG. 2, generate identifier 246 of asymmetric key pair 240 on computing device 202.

The identifier may include any suitable value for identifying the asymmetric key pair. In some examples, the identifier may not include information useful for identifying a user of a computing device. In these examples, the identifier may facilitate the anonymous transfer of information (e.g., as will be explained in greater detail below, the encryption key of the asymmetric key pair and/or the encrypted authentication credential).

Generation module 106 may generate the identifier in any suitable manner. For example, generation module 106 may generate the identifier by generating a pseudo-random value. Additionally or alternatively, generation module 106 may generate the identifier by generating a hash of the asymmetric key pair. As used herein, the term "hash" may refer to any value of a hash function applied to data, data signature, and/or data fingerprint. In some examples, generation module 106 may generate the hash by applying the hash function to the entire asymmetric key pair. Additionally or alternatively, generation module 106 may generate the hash by applying the hash function to a portion of the asymmetric key pair (e.g., the decryption key). In some examples, generation module 106 may generate a hash that is above a predetermined length (e.g., to ensure uniqueness and/or security). Additionally or alternatively, generation module 106 may generate a hash that is below a predetermined length (e.g., to ensure ease of user copying and/or entering).

Using FIG. 4 as an example, at step 416 generation module 106 may, as a part of device 402, generate a hash 418 based on key pair 414.

Returning to FIG. 3, at step 308 one or more of the systems described herein may transmit an encryption key of the asymmetric key pair and the identifier of the asymmetric key pair to a credential repository. For example, at step 308 transmission module 108 may, as part of computing device 202 in FIG. 2, transmit encryption key 242 of asymmetric key pair 240 and identifier 246 of asymmetric key pair 240 to credential repository 208.

As used herein, the phrase "credential repository" may refer to any server, database, repository, and/or other system for storing and/or sharing information. In some examples, the credential repository may include at least a portion of a cloud storage service (e.g., provided by an authentication vendor for transferring credentials). Generally, the credential repository may include a repository accessible to both the first computing device and the second computing device.

Transmission module 108 may transmit the encryption key and the identifier to the credential repository in any suitable manner. For example, transmission module 108 may submit the encryption key to the credential repository to be indexed by the identifier. Accordingly, as will be explained in greater detail below, a subsequent query to the credential repository may retrieve the encryption key using the identifier.

Using FIG. 4 as an example, at step 422 transmission module 108 may, as a part of device 402, transmit key 434 of key pair 414 and hash 418 to repository 404 (e.g., such that hash 418 can be used to retrieve key 434 from repository 404).

Returning to FIG. 3, at step 310 one or more of the systems described herein may display the identifier of the asymmetric key pair to facilitate retrieval of the authentication credential from the credential repository based on the identifier. For example, at step 310 displaying module 110 may, as part of computing device 202 in FIG. 2, display identifier 246 of asymmetric key pair 240 to facilitate retrieval of authentication credential 222 from credential repository 208 based on identifier 246.

Displaying module 110 may display the identifier in any suitable manner. For example, displaying module 110 may display the identifier directly to a user. In this example, displaying module 110 may continue to display the identifier until receiving input from the user indicating that the user has copied the identifier. Additionally or alternatively, displaying module 110 may continue to display the identifier until receiving the encrypted authentication credential. In some examples, displaying module 110 may display the identifier by making the identifier available for display (e.g., by recording the identifier on the second computing device such that the user can retrieve and display the identifier).

While step 310 is depicted after step 308 in FIG. 3, in some examples, displaying module 110 may display the identifier (and, e.g., receive input from the user confirming that the user has acquired the identifier) before transmission module 108 transmits the identifier and the encryption key to the credential repository.

Using FIG. 4 as an example, at step 424 device 402 may display hash 418. Device 402 may continue to display hash 418 until device 402 confirms at step 426 that the user has copied and/or otherwise acquired hash 418.

Figure 5:
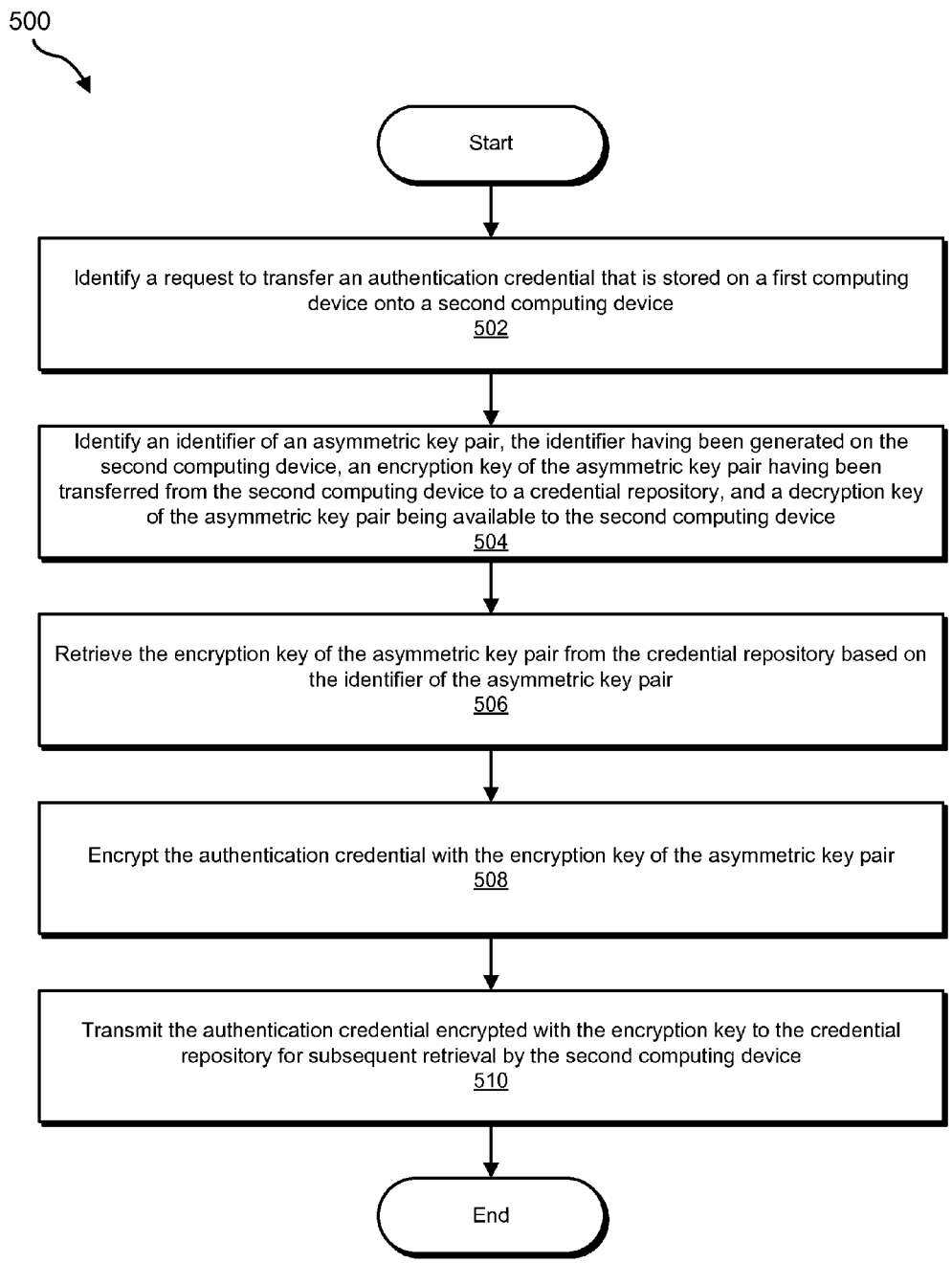
FIG. 5 is a flow diagram of an exemplary method for transferring authentication credentials.

FIG. 5 is a flow diagram of an exemplary computer-implemented method 500 for transferring authentication credentials. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

As illustrated in FIG. 5, at step 502 one or more of the systems described herein may identify a request to transfer an authentication credential that is stored on a first computing device onto a second computing device. For example, at step 502 request module 210 may, as part of computing device 206 in FIG. 2, identify request 220 to transfer authentication credential 222 that is stored on computing device 206 onto computing device 202.

Request module 210 may identify the request in any suitable context. For example, request module 210 may identify the request by receiving user input to initiate a transfer. In some examples, request module 210 may identify the request simply by executing as a part of an application configured to facilitate the transfer of authentication credentials.

In some examples, the request to transfer the authentication credential may include a request to add the authentication credential to the second computing device and remove the authentication credential from the first computing device. Alternatively, the request to transfer the authentication credential may include a request to add the authentication credential to the second computing device while maintaining a copy of the authentication credential on the first computing device (e.g., so that both computing devices may use the authentication credential).

Using FIG. 4 as an example, at step 502 request module 210 may identify the request when device 406 performs a step 427 to initiate the process on device 406 of transferring credential 408 to device 402.

Returning to FIG. 5, at step 504 one or more of the systems described herein may identify an identifier (that was generated on the second computing device) of an asymmetric key pair (an encryption key of the asymmetric key pair having previously been transferred from the second computing device to a credential repository, and a decryption key of the asymmetric key pair being available to the second computing device). For example, at step 504 identifier module 212 may, as part of computing device 206 in FIG. 2, identify identifier 246 (e.g., that was generated on computing device 202) of asymmetric key pair 240.

Identifier module 212 may identify the identifier in any suitable manner. For example, as mentioned earlier, in some examples the identifier may have previously been displayed to a user on the second computing device. Accordingly, identifier module 212 may receive the identifier as user-generated input on the first computing device. Identifier module 212 may receive the identifier in any form of user-generated input. For example, identifier module 212 may receive the user-generated input as typed input, as spoken input, and/or as gesture-based input.

As mentioned earlier, the identifier may include any suitable value. For example, the identifier may include a pseudo-random value. Additionally or alternatively, the identifier may include a hash of the asymmetric key pair (and/or of a portion of the asymmetric key pair) generated by the second computing device.

Using FIG. 4 as an example, at step 428 identifier module 212 may, as a part of device 406, receive hash 418 (e.g., as user-generated input).

Returning to FIG. 5, at step 506 one or more of the systems described herein may retrieve the encryption key of the asymmetric key pair from the credential repository based on the identifier of the asymmetric key pair. For example, at step 506 key module 214 may, as part of computing device 206 in FIG. 2, retrieve encryption key 242 from credential repository 208 based on identifier 246.

Key module 214 may retrieve encryption key 242 from credential repository 208 based on identifier 246 in any suitable manner. For example, as mentioned earlier, one or more of the systems described herein may have submitted the encryption key to the credential repository to be indexed by the identifier. Accordingly, key module 214 may transmit a query with the identifier to the credential repository. The credential repository may then identify the encryption key based on the identifier, and return the encryption key to the first computing device in response to the query.

Using FIG. 4 as an example, at step 430 key module 214 may, as a part of device 406, query repository 404 with hash 418. At step 432, repository 404 may respond to the query with key 434, and key module 214 may receive key 434 on device 406.

Returning to FIG. 5, at step 508 one or more of the systems described herein may encrypt the authentication credential with the encryption key of the asymmetric key pair. For example, at step 508 encryption module 216 may, as part of computing device 206 in FIG. 2, encrypt authentication credential 222 with encryption key 242 (e.g., resulting in encrypted credential 250).

Encryption module 216 may encrypt the authentication credential in any suitable manner. For example, encryption module 216 may encrypt the authentication credential using a predetermined encryption algorithm for which the asymmetric key pair was generated on the second computing device.

Using FIG. 4 as an example, at step 436 encryption module 216 may, as a part of device 406, encrypt credential 408 with key 434 to generate an encrypted credential 438.

Returning to FIG. 5, at step 510 one or more of the systems described herein may transmit the authentication credential encrypted with the encryption key to the credential repository for subsequent retrieval by the second computing device. For example, at step 510 transfer module 218 may, as part of computing device 206 in FIG. 2, transmit encrypted credential 250 to credential repository 208 for subsequent retrieval by computing device 202.

Transfer module 218 may transmit the encrypted authentication credential to the credential repository in any suitable manner. For example, transfer module 218 may submit the encrypted authentication credential to the credential repository to be indexed by the identifier. Accordingly, as will be explained in greater detail below, a subsequent query to the credential repository may retrieve the encrypted authentication credential using the identifier.

In some examples, after transmitting the encrypted authentication credential to the credential repository, transfer module 218 may delete the authentication credential from the second computing device (e.g., so that only one device may use the authentication credential). Alternatively, the systems described herein may maintain a copy of the authentication credential on the first computing device (e.g., so that both computing devices may use the authentication credential).

Using FIG. 4 as an example, at step 440 transfer module 218 may transmit encrypted credential 438 to repository 404. In some examples, transfer module 218 may then remove encrypted credential 438 from device 406.

Returning to FIG. 3, at step 312 one or more of the systems described herein may retrieve the authentication credential, encrypted with the encryption key of the asymmetric key pair, from the credential repository. For example, at step 312 retrieval module 112 may, as part of computing device 202 in FIG. 2, retrieve encrypted credential 250 (e.g., authentication credential 222 encrypted with encryption key 242 of asymmetric key pair 240), from credential repository 208.

Retrieval module 112 may retrieve the authentication credential in any suitable context. For example, retrieval module 112 may periodically query the credential repository (e.g., using the identifier, which may now be associated with the encrypted authentication credential). Additionally or alternatively, retrieval module 112 may receive user input to check the credential repository for the authentication credential.

In some examples, retrieval module 112 may also decrypt the authentication credential with the decryption key of the asymmetric key pair. Additionally, retrieval module 112 may initialize the use of the authentication credential on the second computing device. For example, retrieval module 112 may configure the second computing device to use the authentication credential to generate one-time passwords. Accordingly, retrieval module 112 may use (e.g., directly and/or by causing the second computing device to use) the authentication credential to generate, on the second computing device, a one-time password for authenticating the second computing device with a service that was previously accessed from the first computing device (using, e.g., the same authentication credential).

In some examples, after receiving the authentication credential from the credential repository, retrieval module 112 may also transmit a message to the credential repository to delete the encryption key of the asymmetric key pair. Additionally or alternatively, the message may include an instruction to delete the identifier of the asymmetric key pair and/or the encrypted authenticated credential from the credential repository.

Using FIG. 4 as an example, at step 442 retrieval module 112 may, as a part of device 402, retrieve encrypted credential 438 from repository 404. Retrieval module 112 may also, at step 444, decrypt encrypted credential 438 with a decryption key within key pair 414 to produce credential 408 on device 402.

As explained above, by submitting an encryption key from an asymmetric key pair on the target device to a central repository, along with a unique identifier displayed to a user for an out-of-band verification (and then, e.g., allowing a user to then enter the unique identifier in the source device, allowing the source device to retrieve the encryption key, encrypting the authentication credential, and submitting the encrypted authentication credential to the central repository for retrieval by the target device), the systems and methods described herein may allow a user to conveniently, securely, and, in some examples, anonymously transfer (and/or duplicate) authentication credentials from a source device to a target device. For example, by using an identifier for storing and retrieving the encryption key and/or the encrypted authentication credential that is not traceable to the user (but instead, e.g., is based on a feature of the asymmetric key pair), these systems and methods may provide anonymous transfer of authentication credentials while also providing a secure transfer of the same.

Figure 6:
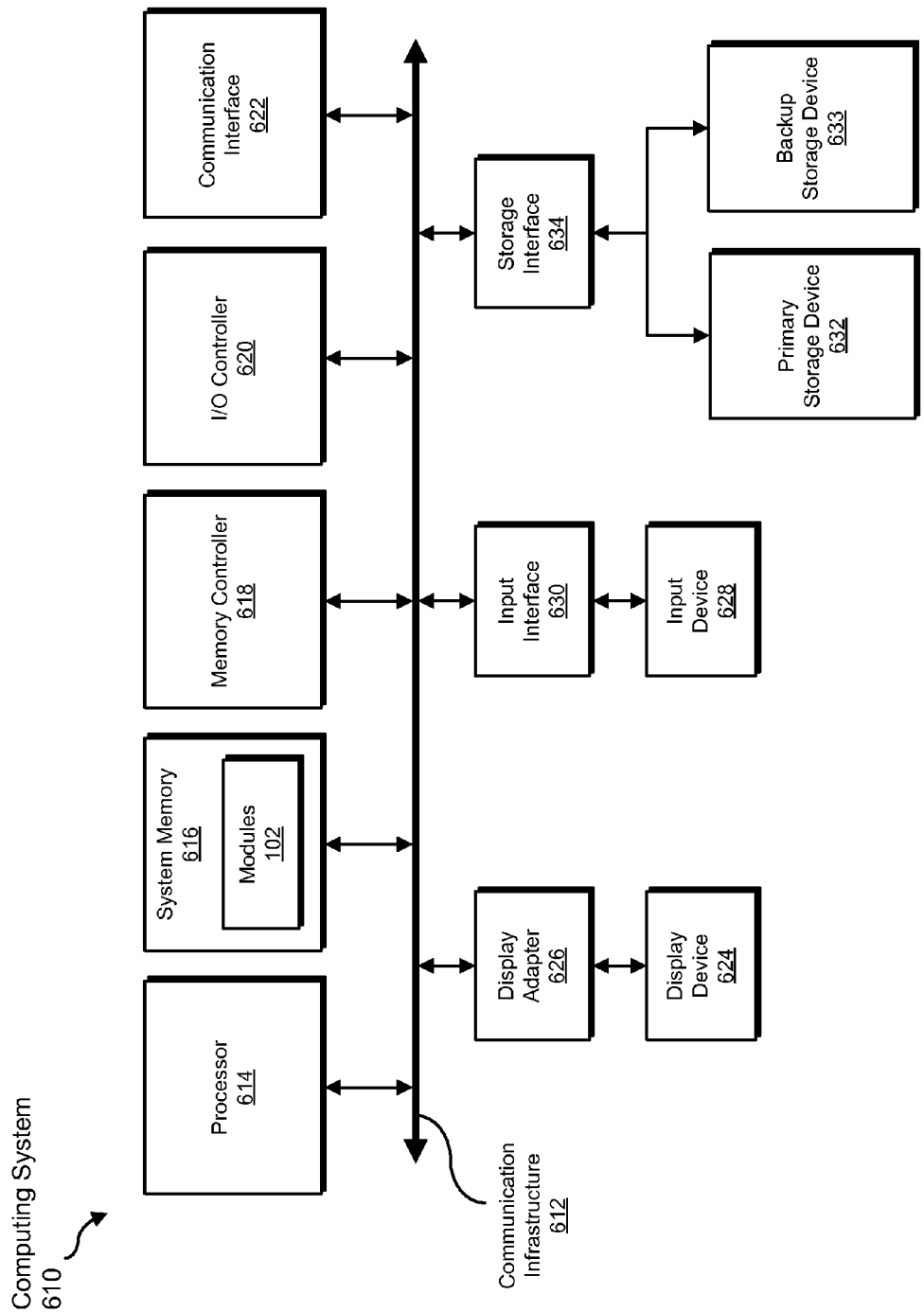
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, generating, transmitting, displaying, receiving, retrieving, encrypting, deleting, decrypting, and using steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
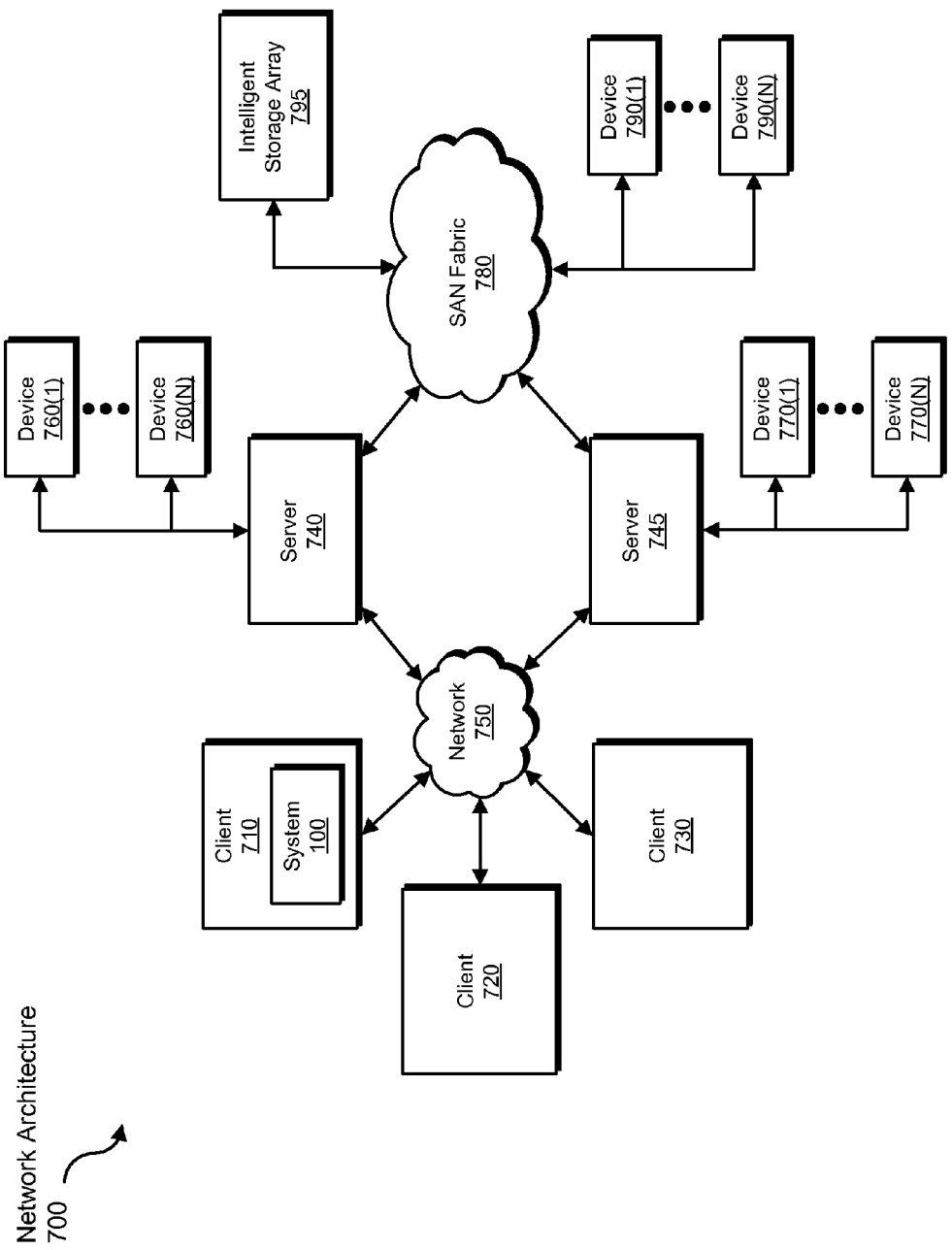
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, generating, transmitting, displaying, receiving, retrieving, encrypting, deleting, decrypting, and using steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770

(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for transferring authentication credentials.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for transferring authentication credentials. As another example, one or more of the modules recited herein may transform a computing device into a device for using authentication credentials to authenticate with services (e.g., by generating one-time passwords for use with the services).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for transferring authentication credentials, at least a portion of the method being performed by a computing device comprising at least one processor, the method comprising:

identifying a transfer request by a second computing device to receive an authentication credential that is stored on a first computing device onto the second computing device;

identifying an asymmetric key pair on the second computing device;

generating an identifier of the asymmetric key pair on the second computing device;

transmitting, by the second computing device, an encryption key of the asymmetric key pair and the identifier of the asymmetric key pair to a credential repository, wherein the decryption key of the asymmetric key pair is available at the second computing device;

displaying, by the second computing device, the identifier of the asymmetric key pair to facilitate retrieval of the authentication credential from the credential repository based on the identifier that is used by the first computing device to query and retrieve the encryption key and transfer the authentication credential encrypted with the encryption key to the credential repository;

retrieving, by the second computing device, the encrypted authentication credential from the credential repository.

2. The computer-implemented method of claim 1, further comprising decrypting the encrypted authentication credential with a decryption key of the asymmetric key pair.

3. The computer-implemented method of claim 1, wherein generating the identifier of the asymmetric key pair comprises generating a hash of the asymmetric key pair.

4. The computer-implemented method of claim 1, further comprising transmitting a message to the credential repository to delete the encryption key of the asymmetric key pair.

5. The computer-implemented method of claim 1, further comprising using the authentication credential to generate, on the second computing device, a one-time password for authenticating the second computing device with a service that was previously accessed from the first computing device.

6. A computer-implemented method for transferring authentication credentials, at least a portion of the method being performed by a computing device comprising at least one processor, the method comprising:

identifying a request by a second computing device to transfer an authentication credential that is stored on a first computing device onto the second computing device;

identifying an identifier of an asymmetric key pair, the identifier having been generated on the second computing device, the identifier and an encryption key of the asymmetric key pair having been transferred from the second computing device to a credential repository, and a decryption key of the asymmetric key pair being available at the second computing device;

retrieving, by the first computing device, the encryption key of the asymmetric key pair from the credential repository based on the identifier;

encrypting the authentication credential with the encryption key at the first computing device;

transmitting the authentication credential encrypted with the encryption key to the credential repository for subsequent retrieval by the second computing device.

7. The computer-implemented method of claim 6, wherein the identifier of the asymmetric key pair comprises a hash of the asymmetric key pair generated by the second computing device.

8. The computer-implemented method of claim 6, wherein:
the identifier of the asymmetric key pair was displayed by the second computing device to a user;
identifying the identifier of the asymmetric key pair comprises receiving the identifier as a user-generated input on the first computing device.

9. The computer-implemented method of claim 6, further comprising deleting the encrypted authentication credential from the second computing device after transmitting the authentication credential to the credential repository.

10. The computer-implemented method of claim 6, further comprising using the authentication credential to generate, on the first computing device, a one-time password for authenticating the first computing device with a service that was previously accessed from the second computing device.

11. A system for transferring authentication credentials, the system comprising:

an identification module programmed to:
identify a transfer request by a second computing device to receive an authentication credential that is stored on a first computing device onto the second computing device;
identify an asymmetric key pair on the second computing device;

a generation module programmed to generate an identifier of the asymmetric key pair on the second computing device;

a transmission module programmed to transmit, by the second computing device, an encryption key of the asymmetric key pair and the identifier of the asymmetric key pair to a credential repository, wherein the decryption key of the asymmetric key pair is available at the second computing device;

a displaying module programmed to display, by the second computing device, the identifier of the asymmetric key pair to facilitate retrieval of the authentication credential from the credential repository based on the identifier that is used by the first computing device to query and retrieve the encryption key and transfer the authentication credential encrypted with the encryption key to the credential repository;

a retrieval module programmed to retrieve, by the second computing device, the encrypted authentication credential from the credential repository;

at least one processor configured to execute the identification module, the generation module, the transmission module, the displaying module, and the retrieval module.

12. The system of claim 11, wherein the retrieval module is further programmed to decrypt the encrypted authentication credential with a decryption key of the asymmetric key pair.

13. The system of claim 11, wherein the generation module is programmed to generate the identifier of the asymmetric key pair by generating a hash of the asymmetric key pair.

14. The system of claim 11, wherein the retrieval module is further programmed to transmit a message to the credential repository to delete the encryption key of the asymmetric key pair.

15. The system of claim 11, wherein the retrieval module is further programmed to use the authentication credential to generate, on the second computing device, a one-time password for authenticating the second computing device with a service that was previously accessed from the first computing device.

16. The system of claim 11, further comprising:
a request module programmed to identify, at the first computing device, a request by the second computing device to transfer the authentication credential that is stored on the first computing device onto the second computing device;
an identifier module programmed to identify the identifier of the asymmetric key pair;
a key module programmed to retrieve, by the first computing device, the encryption key of the asymmetric key pair from the credential repository based on the identifier;

an encryption module programmed to encrypt the authentication credential with the encryption key at the first computing device;

a transfer module programmed to transmit the authentication credential encrypted with the encryption key to the credential repository for subsequent retrieval by the second computing device;

at least one additional processor configured to execute the request module, the identifier module, the key module, the encryption module, and the transfer module.

17. The system of claim 16, wherein the identifier of the asymmetric key pair comprises a hash of the asymmetric key pair generated by the second computing device.

18. The system of claim 16, wherein:

the identifier of the asymmetric key pair was displayed by the second computing device to a user;

identifying the identifier of the asymmetric key pair comprises receiving the identifier as a user-generated input on the first computing device.

19. The system of claim 16, wherein the transfer module is further programmed to delete the authentication credential from the second computing device after transmitting the authentication credential to the credential repository.

20. The system of claim 16, wherein the transfer module is further programmed to use the authentication credential to generate, on the first computing device, a one-time password for authenticating the first computing device with a service that was previously accessed from the second computing device.

* * * * *